R. S. BRYANT.
RIM FOR VEHICLE WHEELS.
APPLICATION FILED APR. 25, 1912.
1,322,529.
Patented Nov. 25, 1919.
2 SHEETS—SHEET 1.
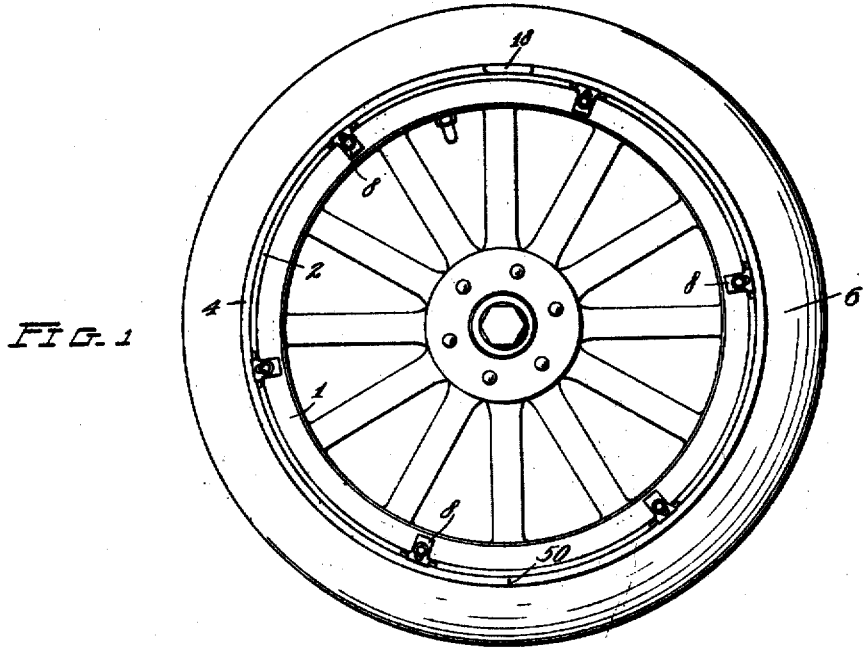
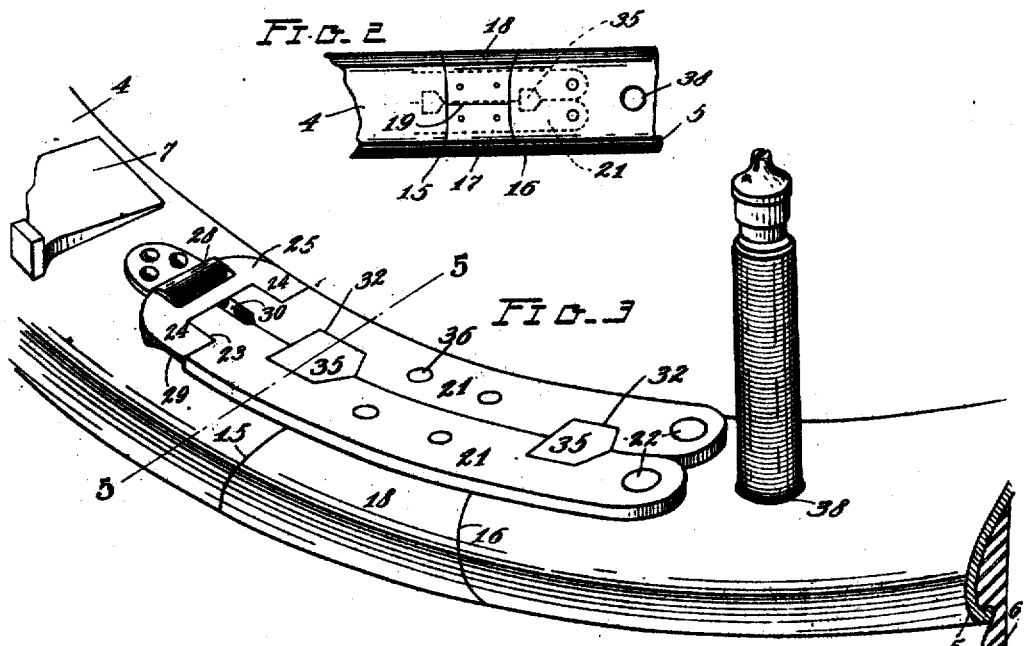

R. S. BRYANT.
RIM FOR VEHICLE WHEELS.
APPLICATION FILED APR. 25, 1912.
1,322,529.
Patented Nov. 25, 1919.
2 SHEETS—SHEET 2.
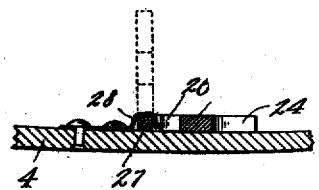
FIG. 6
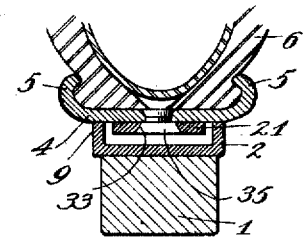
FIG. 5
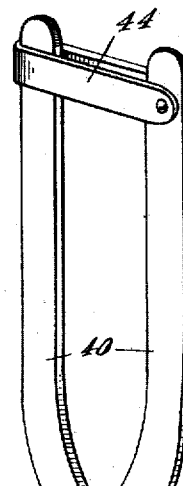
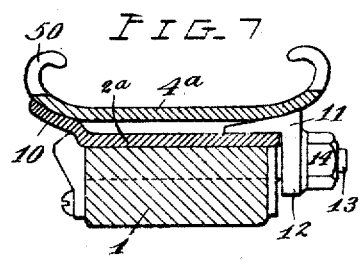
FIG. 7
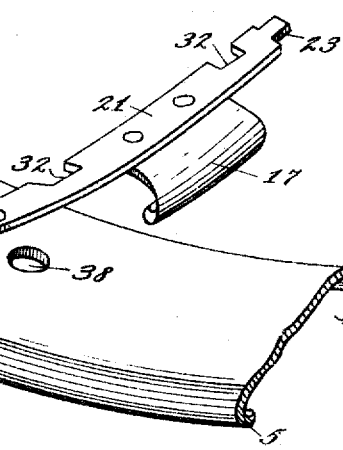
FIG. 4
Witnesses:
Brennan B. West.
Chas. O. Watt.
Inventor
Richard S. Bryant
By Hull & Smith
Attys.

UNITED STATES PATENT OFFICE.

RICHARD S. BRYANT, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

RIM FOR VEHICLE-WHEELS.

1,322,529.  Specification of Letters Patent.  Patented Nov. 25, 1919.

Application filed April 25, 1912. Serial No. 693,077.

*To all whom it may concern:*

Be it known that I, RICHARD S. BRYANT, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to vehicle wheels and has for its object the provision of a rim which can be manipulated so as to permit the rapid and easy application of a tire thereto or its removal therefrom; the provision of a demountable rim which may be collapsed, after removal from the felly with which it is operatively associated, in a more convenient and expeditious manner than has been possible with hitherto known devices; the provision of a rim having a removable segmental portion which can readily be displaced so as to permit the contraction of the rim and the freeing of the tire; the provision of new and improved securing means whereby the removable sections may be retained in place during the use of the rim; the provision of means for relieving the tension upon the rim so as to facilitate its contraction; the provision of a new and improved tool for drawing and holding the rim to contracted position; while further objects and advantages of my invention will be made manifest in the course of the following description and claims.

In the drawings accompanying and forming part of this application I have disclosed the preferred embodiment of my invention in connection with a rim of the "clencher" type, whereby I mean that type having laterally inturned flanges at its sides adapted to hook over the beads or flanges formed at the sides of the tires, although it will be obvious that my improvements will operate as successfully with rims having straight flanges at the sides adapted for the reception of straight wall tires. In these drawings, Figure 1 represents the side elevation of an automobile wheel equipped with a rim made in accordance with my invention; Fig. 2 is an edge view of a portion of a rim containing my improvements; Fig. 3 is a perspective view of a portion of the interior of my improved rim illustrating the same with the tire secured thereto and with the parts arranged for application to the wheel felly; Fig. 4 is a similar view showing the position occupied by the parts when the rim is contracted, the contracting tool being also illustrated; Fig. 5 is a cross sectional view of the parts taken upon the broken line 5—5 of Fig. 3; Fig. 6, a detail cross sectional view taken longitudinally through the middle of the rim and spring catch; and Fig. 7 is a cross sectional view illustrating my improved rim in combination with a second expedient for removably securing the same to the felly band and also showing the method of relieving the rim so as to facilitate its contraction.

Describing the parts by reference characters, 1 represents the felly of a wheel which is of the usual wood construction and 2 the annular metallic felly-band which is securely shrunk thereon so as to bind the parts of the wheel securely together as in the usual practice. Secured around the periphery of this felly-band in any convenient manner is a demountable rim 4, here shown as having integral inturned flanges 5—5 at its sides adapted to engage the sides of the clencher tire 6 in the usual manner. The preferred expedient for securing this rim in place comprises wedge blocks 7 secured to the inner face of the rim and coöperating with complementary wedge blocks secured to the exterior of the felly band, the blocks on the rim being engaged by suitable clamps 8 carried by the felly whereby they are shifted into place and securely held against displacement, this expedient being more fully disclosed and claimed in my copending application Ser. No. 693,080, now Patent 1,216,278, Feb. 20, 1917, filed of even date herewith. The sides of the felly band are illustrated as provided with lateral outturned flanges 9, one of which is formed with suitable notches for the reception of the blocks 7, and both of which approach closely the inner surface of the rim 4.

The precise form of securing means employed is not important in the present case since the invention of the present application is confined more particularly to the features of construction of the demountable rim itself, although it is necessary that the rim be removable from the felly in some manner. I have accordingly illustrated in Fig. 7, a rim made in accordance with my invention secured to the felly by means of an expedient well known and widely used in the art. In this embodiment the rim is shown at 4ª, the felly at 1, and the felly band at 2ª, said felly band having at one side the outwardly flaring integral flange 10 adapted to fit closely against one of the curving sides of the rim. The opposite side of the felly band is flat and parallel to the axis of the wheel. The rim is secured in place by means of spaced wedge blocks 11 having depending apertured ears 12 for the reception of bolts 13, the wedges being driven home by nuts 14. In this modification the blocks 6 are omitted, and the rim is reversible, driving being effected by means of the usual interfitting blocks (not shown) secured to the rim and felly band respectively. It will be noted that both of these constructions provide annular spaces between the rim and the felly band, which spaces are important to my invention.

Referring to Figs. 2, 3 and 4, it will be seen that the rim of my invention comprises a metallic channel member or band formed into a nearly circular form and having its adjacent ends spaced apart as at 15, 16. The space between these ends is filled by means of a removable segmental portion formed of two sections 17 and 18 which meet at 19 upon a line substantially parallel with the plane of the rim. The ends of these sections conform quite closely to the ends of the channel member and their collective cross section is substantially the same as that of the rest of the rim. It will be obvious that this construction may be effected either by first forming the rim as a complete circle and afterward removing these sections by sawing or shearing or by forming the several parts separately and afterward assembling them, although I esteem the former method as more advantageous.

In order to secure the adjacent ends of the channel member in fixed relation relative to each other so as to prevent lateral or radial movement thereof and to withstand the expansive stress caused by the mounting of the rim upon the felly, and also to secure the removable sections in their proper location, I provide tie plates or tension bars secured both to the ends of the channel member and to the sections 17, 18. The method by which this securing will be effected must comprise detachable connections at some points, and may or may not comprise permanent connections at other points, it being merely necessary to my device that the sections 17 and 18 be capable of such releasing as to permit of their being removed or swung outwardly in a direction substantially normal to the plane of the rim, so as to permit the channel member to be contracted and thus facilitate the removal or replacement of the tire. It is apparent that the sidewise movement of these sections will meet with a minimum of opposition from the tire itself, and will also remove them completely from the path of movement of the ends of the channel member.

The form and method of attachment of these bars or members may vary very widely within the scope of my invention, the construction disclosed herein being but one of many which may be adopted to the end in view. In this embodiment a pair of twin tension bars 21, 21 are provided, having their ends pivoted to fixed studs 22, 22 carried by the inner face of the channel member adjacent to one of the free ends thereof. The other ends of these bars are rabbeted at their outer edges as at 23 so as to lie between the arms 24, 24 of a U shaped clevis or catch member 25. This member is preferably formed with a slot 26 transverse to the median line of the rim which defines a prismatic hinge portion 27. This prismatic portion is then confined beneath the free end of a leaf-spring clip 28 which is rigidly secured to the inner face of the channel member at the end opposite to the studs 22, 22. This method of mounting serves to hold the clevis yieldingly in securing position or to return it to such position when removed but a short distance therefrom. If, however, the clevis be displaced a greater amount it will be retained in this position as indicated in dotted lines in Fig. 6. The arms 24, 24 are beveled or undercut on their outer sides as shown at 29 so as to facilitate the displacement of the same, and the free ends of the bars 21, 21 are similarly beveled as at 30 for a purpose to be described later.

The inner edge of each of the bars 21, is formed with a notch 32 registering with a similar notch formed in the adjacent edge of the other bar. These notches are so spaced from the ends of the bars as to lie within the ends of the channel member (see Fig. 3) and the bottoms of said notches are beveled or dove tailed at 33 similarly to the portion 30, (see Fig. 5). Rigidly secured to the inner face of the channel member adjacent to each of its ends is a block 35, each of said blocks being so located as to be received in one pair of notches 32, and so shaped as substantially to fit and fill the same. The block which lies nearer to the pivot studs 22 preferably has its rearward side formed upon a broken line, each half thereof being substantially tangent to the circle drawn around the adjacent pivot. The notches are similarly shaped, this construction being adopted for the purpose of permitting the free swinging of the bars while maintaining the outward wedging action due to longitudinal strain at the lowest possible point. The forward faces of the blocks are preferably square so that the stress will be normal thereto. Both blocks are usually made of the same shape in order to decrease the expense of manufacture, though the block farther from the pivot studs could as well be square on both sides as far as the operation of the device is concerned.

One of the sections 17, 18 is attached as by rivets 36 to each of the bars 21, the joint 19 between the sections preferably overlapping one of the bars as shown in Fig. 2. This result can be attained either by displacing the bars laterally while splitting the sections at the center, by splitting the sections asymmetrically while keeping the bars central, or by splitting the sections symmetrically while making one bar wider than the other. The last method is less desirable since it unnecessarily increases the number of different shaped parts and of dies, the first method is impracticable in some cases because of the obstruction to the reversal of the rim, but the second method is free from all objections. The end of the channel member nearest to the pivot studs is preferably rounded as shown in Fig. 2 so that each side will substantially coincide with the arc of the circle drawn about the adjacent stud. The other end of the member can be formed to any preferred shape, provided that it be not undercut, since this would prevent the swinging of the members. The hole 38 for the valve stem is preferably formed in the channel member adjacent to the sections 17, 18 since the obstruction to the manipulation of the tire will then be least.

For manipulating the rim I provide the tool illustrated in Fig. 4. This tool consists of a pair of intersecting members 40—40 pivoted on a rivet 41 at their point of intersection, the forward ends thereof being bent as at 42 and provided with notches 43 to fit the blocks 35, 35. The notches are preferably of the same shape so as to permit reversal of the tool, notwithstanding the fact that the blocks are not symmetrical. The handles of the members are provided with a link 44 whereby they may be held together.

Heretofore the contraction of the rim has been very difficult because of the stiffness of the lateral flanges thereon, and to overcome this defect I preferably sever these flanges by one or more narrow saw scarfs 50 at a point substantially opposite the segments 18 and 19, thus relieving in large part the opposition of the rim to constriction without materially weakening the same for normal use.

The operation of the device is as follows:—The rim and tire being removed from the wheel as shown in Fig. 3, a suitable tool is inserted beneath the beveled sides 29 of the clevis 25 so as to pry the same upwardly, after which a tool is inserted between the beveled ends 30 of the bars 21 so as to pry the same apart. This operation meets with no resistance from the tire (excepting such small opposition as may flow from the adhesion of the rubber to the metal) and the segments 17 and 18 are easily opened out to the position shown in Fig. 4. The free ends of the channel member may now be brought together so as to decrease the diameter of the same and facilitate the removal of the tire in an obvious manner, while the bars 21, 21 project laterally so near the valve stem that the tire may be moved as much as desired without interference from this source. The application of the tire to the rim is effected while the channel member is contracted, the valve stem being first inserted into the aperture 38 and the remainder of the shoe being then worked into position in the usual manner. The contracting tool is then removed and the clevis 25 closed, after which the bars 21, 21 are swung toward each other. The wedge shape of the segments causes the free ends of the channel member to be forced apart the requisite distance, the clevis 25 displaced by the action of the inclined portions 30 and 29, until the bars 21, 21 have reached their most inward position whereupon they are locked by the forward movement of the clevis. The engagement of the inclined sides of the blocks 35 with the similarly inclined sides of the notches 32 holds the ends of the channel member against radial movement, while the engagement of the ends of these blocks with the ends of the notches withstands the expansive stress caused by the forcing of the rim onto the felly.

When the rim is to be mounted on the felly, the valve stem is first inserted through its usual aperture, this movement also serving to introduce the bars 21, 21 between the side flanges 9 of the felly in case a felly band of the shape shown in Fig. 5 be employed, or to position the same alongside the flange 10 in case such a band as shown in Fig. 7 be used. The inclusion of these members in the narrow space thus provided absolutely prevents the opening of the members 21—21 even if the clevis 25 should fail or be omitted. Likewise the proximity of the clevis to the face of the felly band prevents its opening even though the spring 28 should fail or break. While I have necessarily described my invention in detail and pointed out the most preferable construction that I now contemplate, it is obvious that many changes in such details may be made without departing from the scope of my inventive idea. So far as I am aware no person has ever heretofore produced a rim having segments removable therefrom in a lateral direction so as to permit the contraction of the remainder of the rim, and I conceive any construction whereby this result is attained to be within the scope of my invention irrespective of the particular manner of manipulating said sections or of securing them in place. It is also obvious that while tension means of some nature are necessary for the connection of the free ends of the channel member, the shape, and mode of attachment of these members is susceptible of great variation without departing from the spirit of my invention. Furthermore, although this construction is susceptible of easier manipulation in connection with a tire of the clencher type than any other known expedient whereby the contraction of the rim body away from the tire is permitted, by reason of the fact that the motion of the parts is not opposed by any projecting portion of the tire, it is obvious that the device could be employed with tires of other types with equal facility. I have chosen for illustration a rim of the clencher type, because this construction illustrates in the most emphatic degree the advantages of my construction.

Having thus described my invention, what I claim is:—

1. A rim for vehicle wheels comprising a discontinuous annular laterally flanged member adapted to receive and seat a tire; and a segmental section adapted to be interposed between the ends of said member, said section and ends being formed for wedging engagement.

2. A rim for vehicle wheels comprising a discontinuous annular laterally flanged member adapted to receive and seat a tire; and a segmental section adapted to be interposed between the ends of said member, said section and ends being formed for lateral wedging engagement.

3. A rim for vehicle wheels comprising a discontinuous annular laterally flanged member adapted to receive and seat a tire; and two segmental sections, complementary to each other, adapted to be interposed between the ends of said member, said sections and ends being formed for wedging engagement.

4. A tire-supporting rim for vehicle wheels comprising a discontinuous annular member; and two segmental sections, complementary to each other, adapted to be interposed between the ends of said member, said sections and ends being formed for lateral wedging engagement.

5. The combination with a transversely split tire-supporting rim for vehicle wheels; of a segmental section adapted to be interposed between the ends of said rim, said section being pivotally secured to one end of said rim, about a substantially radial axis, and being detachably secured to the other end of said rim.

6. The combination with a transversely split tire-supporting rim for vehicle wheels, of a segmental section adapted to be interposed between the ends of said rim; and a member movable relatively to such ends and adapted to bridge the space between the same, said rim-section being attached to said member so as to be movable therewith.

7. The combination with a transversely split tire-supporting rim for vehicle wheels, of a segmental section adapted to be interposed between the ends of said rim, said section and ends being formed for wedging engagement; and a member movable relatively to such ends and adapted to bridge the space between the same, said rim-section being attached to said member so as to be movable therewith.

8. The combination with a transversely split tire-supporting rim for vehicle wheels, of a segmental section adapted to be interposed between the ends of said rim, said section and ends being formed for lateral wedging engagement; and a member movable relatively to such ends and adapted to bridge the space between the same, said rim-section being attached to said member so as to be movable therewith.

9. The combination with a transversely split tire-supporting rim for vehicle wheels; of a segmental section adapted to be interposed between the ends of said rim; and a member pivotally secured to one end of said rim about a substantially radial axis, and being detachably secured to the other end of said rim, said rim-section being attached to said member so as to be carried thereby.

10. The combination with a transversely split tire-supporting rim for vehicle wheels; of a segmental portion adapted to be interposed between the ends of said rim, said portion being split longitudinally of the rim into a plurality of sections and each such section being pivotally secured to one end, and detachably secured to the other end, of said rim.

11. The combination with a transversely split tire-supporting rim for vehicle wheels; of a segmental portion adapted to be interposed between the ends of said rim, said portion being split longitudinally of the rim into a plurality of sections; and a plurality of members movable relatively to such ends and adapted to bridge the space between the same, said sections being attached to said members, so as to be movable therewith.

12. The combination with a transversely split tire-supporting rim for vehicle wheels; of a segmental portion adapted to be interposed between the ends of said rim, said portion being split longitudinally of the rim into a plurality of sections, and said sections and rim-ends being formed for wedging engagement; and a plurality of members movable relatively to such ends and adapted to bridge the space between the same, said sections being attached to said members, so as to be movable therewith.

13. The combination with a transversely split tire-supporting rim for vehicle wheels;

of a segmental portion adapted to be interposed between the ends of said rim, said portion being split longitudinally of the rim into a plurality of sections, and said sections and rim-ends being formed for lateral wedging engagement; and a plurality of members movable relatively to such ends and adapted to bridge the space between the same, said sections being attached to said members, so as to be movable therewith.

14. The combination with a transversely split tire-supporting rim for vehicle wheels; of a segmental portion adapted to be interposed between the ends of said rim, said portion being split longitudinally of the rim into a plurality of sections; and a plurality of members respectively pivotally secured to one end, and detachably secured to the other end of said rim, said sections being attached to said members so as to be carried thereby.

15. The combination with a transversely split tire-supporting rim for vehicle wheels; of a segmental section adapted to be interposed between the ends of said rim, said section being flared or widened from the center line of the rim toward the side thereof, so as to be removable in a lateral direction.

16. The combination with a transversely split tire-supporting rim for vehicle wheels; of a segmental section adapted to be interposed between the ends of said rim, said section being flared or widened from the center line of the rim toward the side thereof, so as to be removable in a lateral direction, and said section being pivotally secured to the one end and detachably secured to the other end, of said rim.

17. The combination with a transversely split tire-supporting rim for vehicle wheels; of a segmental portion adapted to be interposed between the ends of said rim, said portion being longitudinally split into a plurality of sections respectively flared or widened from the center line of the rim toward the side thereof so as to be removable in a lateral direction; and members attached to said sections respectively, and detachably connected to the free ends of said rim, said members being adapted to bridge the space between such rim ends and to secure said sections in alinement therewith.

18. In a vehicle rim, the combination, with a channel member adapted to embrace a felly band, the ends of said channel member being spaced apart when the member is so positioned, of a removable segmental portion adapted to be interposed between said spaced ends and to complete the circle defined by said channel member, said removable portion being longitudinally split into a plurality of laterally displaceable sections, a tension bar secured to the inner face of each of said sections, and projecting beyond the ends thereof, abutment members carried by the inner face of said channel member adjacent to the ends thereof, said tension bars being shaped to engage with said abutment members and hold said channel member against expansion, said abutment members being under cut and said tension bars complementarily shaped to prevent radial expansion of the ends of said channel member, and means for securing said tension bars in engagement with said abutment members.

19. In a vehicle rim, in combination, a curved channel member adapted to embrace a wheel felly and having its ends spaced apart, a removable segmental portion adapted to be interposed between said ends to complete the circle defined by said channel member, said removable portion being split longitudinally into a pair of laterally removable sections and the combined cross section of said removable sections being substantially the same as that of said channel member, a tension bar secured to the inner face of each of said sections and projecting beyond the ends thereof, said tension bars being adapted to lie substantially parallel and adjacent to each other when said sections are in alinement with the ends of said channel member, and the adjacent edges of said tension bars being provided with notches beyond the ends of said sections, abutment members carried by the inner face of said channel member adjacent to each of its ends and adapted to be engaged by said notches, and means carried by the inner face of said channel member for detachably securing said bars in engagement with said abutment members.

20. In a vehicle rim, in combination, a curved channel member adapted to embrace a wheel felly and having its ends spaced apart, a removable segmental portion adapted to be interposed between said ends to complete the circle defined by said channel member, said removable portion being split longitudinally into a pair of laterally removable sections and the combined cross section of said removable sections being substantially the same as that of said channel member, a tension bar secured to the inner face of each of said sections and projecting beyond the ends thereof, said tension bars being adapted to lie substantially parallel and adjacent to each other when said sections are in alinement with the ends of said channel member, and the adjacent edges of said tension bars being provided with notches beyond the ends of said sections, abutment members carried by the inner face of said channel member adjacent to each of its ends and adapted to be engaged by said notches, and latching means carried by the inner face of said channel member, said latching means having projecting portions adapted to engage said bars to secure the same in engagement with said abutment members.

21. In a vehicle rim, in combination, a curved channel member adapted to embrace a wheel felly and having its ends spaced apart, a removable segmental portion adapted to be interposed between said ends to complete the circle defined by said channel member, said removable portion being split longitudinally into a pair of laterally removable sections, the combined cross section whereof is substantially the same as that of said channel member, a tension bar secured to the inner face of each of said sections and projecting beyond the ends thereof, said bars being pivoted to the inner surface of said channel member at one end and being adapted to lie substantially parallel and adjacent to each other when said sections are in alinement with the ends of said channel member, and the adjacent edges of said tension bars being provided with notches beyond the ends of the said sections, an abutment member carried by the inner face of said channel member adjacent to each of its ends and adapted to be received by said notches, and means for securing together the free ends of the said tension bars.

22. In a vehicle rim, in combination, a curved channel member adapted to embrace a wheel felly and having its ends spaced apart, a removable segmental portion adapted to be interposed between said ends to complete the circle defined by said channel member, said removable portion being split longitudinally into a pair of laterally removable sections, the combined cross section whereof is substantially the same as that of said channel member, a tension bar secured to the inner face of each of said sections and projecting beyond the ends thereof, said bars being pivoted to the inner surface of said channel member at one end and being adapted to lie substantially parallel and adjacent to each other when said sections are in alinement with the ends of said channel member and the adjacent edges of said tension bars being provided with notches beyond the ends of the said sections, abutment members carried by the inner face of said channel member adjacent to each of its ends and adapted to be received by said notches, the side of the abutment member nearest to each pivot being formed substantially upon a tangent to the circle drawn about said pivot, and the corresponding notch being complementarily shaped, and means carried by the inner face of said channel member for detachably securing said bars in engagement with said abutment members.

23. In a vehicle rim, in combination, a curved channel member adapted to embrace a wheel felly and having its ends spaced apart, a removable segmental portion adapted to be interposed between said ends to complete the circle defined by said channel member, said removable portion being split longitudinally into a pair of laterally removable sections, and the combined cross section of said removable sections being substantially the same as that of said channel member, a tension bar secured to the inner face of each of said sections and projecting beyond the ends thereof, said tension bars being adapted to lie substantially parallel and adjacent to each other when said sections are in alinement with the ends of said channel member, and the adjacent edges of said tension bars being provided with notches beyond the ends of said sections, abutment members carried by the inner face of said channel member adjacent to each of its ends and adapted to be engaged by said notches, the sides of said abutment members being undercut and the sides of said notches being complementarily shaped whereby radial movement of the ends of said channel member is prevented when said tension members are in engaged position, and means for securing said tension bars in engagement with said abutments.

24. In a vehicle rim, in combination, a curved channel member adapted to embrace a wheel felly and having its ends spaced apart, a removable segmental portion adapted to be interposed between said ends to complete the circle defined by said channel member, said removable portion being split longitudinally into a pair of laterally removable sections and the combined cross section of said removable sections being substantially the same as that of said channel member, a tension bar secured to the inner face of each of said sections and projecting beyond the ends thereof, said tension bars being adapted to lie substantially parallel and adjacent to each other when said sections are in alinement with the ends of said channel member, and the adjacent edges of said tension bars being provided with notches beyond the ends of said sections, abutment members carried by the inner face of said channel member adjacent to each of its ends and adapted to be engaged by said notches, the sides of said abutment members being undercut and the sides of said notches being complementarily shaped whereby radial movement of the ends of said channel member is prevented when said tension members are in engaged position, one end of each of said tension members being pivoted to said channel member beyond the adjacent abutment member, and means engaging the other ends of said tension bars for maintaining them in engagement with said abutment members.

25. A device of the character described, comprising a transversely split rim, a pair of complementary members pivotally attached to and projecting beyond one end of said rim, a projection on the other end of said rim, said members being recessed on their juxtaposed edges to engage such projection and thereby prevent circumferential separation of such ends, and a pivotal latch on such second rim-end, adapted in one position to engage said member and lock the same in place.

In testimony whereof, I hereunto affix my signature in the presence of two witnesses.

RICHARD S. BRYANT.

Witnesses:
 HAROLD S. SMITH,
 J. B. HULL.